2,704,282

POLYOXAMIDES OF 3-ALKOXYHEXA-METHYLENEDIAMINES

Gelu S. Stamatoff, Newark, Del., assignor to E. I. du Pont de Nemours and Company, Wilmington, Del., a corporation of Delaware No Drawing. Application June 14, 1952,
Serial No. 293,668

8 Claims. (Cl. 260—78)

This invention relates to polyoxamides of alkoxyhexamethylenediamines and particularly to polyoxamides of 3-methoxyhexamethylenediamine, 3-ethoxyhexamethylenediamine, and 3-isobutoxyhexamethylenediamine. The invention also relates to a novel process for preparing high molecular weight polyoxamides of these alkoxyhexamethylenediamines.

Polyoxamides in very wide variety have been known heretofore (cf. copending application of Stamatoff, S. N. 293,667, filed June 14, 1952). In general, the preferred method for preparing polyoxamides has been by reaction between dialkyl oxalates and the appropriate diamines (cf. USP 2,558,031 and 2,172,374).

As disclosed in USP 2,558,031, polymers prepared from diethyloxalate and alkylene diamines, at least in certain instances, have melting points which are considerably higher than polymers produced by heating the corresponding alkylene diammonium oxalates in an inert atmosphere. The present applicants have discovered, in contrast with the foregoing teachings, that the reaction between diethyloxalate and alkoxy-substituted alkylene diamines, such as 3-ethoxy hexamethylenediamine, in ethanol solution fails to give a polymer having a sufficiently high melting point or a sufficiently high inherent viscosity to be useful in the manufacture of plastics, bristles, etc. However, the present applicants have also discovered that the relatively low molecular weight polyoxamide obtained in this manner is capable of being polymerized further by the action of heat, as a result of which new polyoxamides having high molecular weights and excellent properties which are suitable for a wide variety of applications are obtained.

More particularly it has been discovered, in accordance with a specific embodiment of this invention, that the low molecular weight polymers obtained from such reactants (e. g. 3-methoxyhexamethylenediamine and dimethyloxalate) can be converted to a high molecular weight polymer by the action of heat at temperatures slightly in excess of the melting point of the polymer. Similar results are obtained using other dialkyl oxalates in which the alkyl groups contain up to 4 carbon atoms. Moreover, similar products are obtained by employing in place of 3-methoxyhexamethylenediamine any 3-alkoxyhexamethylenediamine, e. g., one in which the alkoxy group contains from 1 to 4 carbon atoms.

The first step in the polymerization process, namely, the formation of the low molecular weight polymer, is hereinafter referred to as prepolymerization. The final product, as described in detail hereinafter, is thus obtained by polymerization of the prepolymer. The inherent viscosity of the prepolymer is generally within the range of about 0.25 to 0.50, while the inherent viscosity of the final polymer varies from about 0.6 to 1.4. The polymerization of the prepolymer can be effected in the presence of added catalyst but it also takes place thermally, i. e., in the absence of added catalysts. Suitable catalysts include such acidic materials as phosphorous acid, zinc chloride, ammonium chloride, etc.

The 3-alkoxyhexamethylenediamine polyoxamides, obtained by converting the prepolymers, are quite stable to heat but they tend to decompose thermally at temperatures above about 300°–315° C. Accordingly, the temperature of the melt in the final polymerization should not exceed about 315° and preferably should be between the melting temperature and the maximum temperature at which the polymer is thermally stable, i. e., sufficiently stable to be prepared. For best results the temperature should be only slightly higher than the melting point of the final polymer.

In the preparation of prepolymers as above described, a wide variety of organic diluents may be employed. These diluents include the liquid alkanols, as well as other inert liquids such as toluene, ethylbenzene, xylenes, etc. Water, however, should be avoided because a progressive decrease in molecular weight of the final polymer results from increased amounts of water in the prepolymerization mixture.

The polymerization of the prepolymer can be carried out in the presence of an inert diluent, if desired. Best results are obtained, however, in the absence of an added medium.

The temperature employed during the prepolymerization step is not highly critical. Temperatures as low as −7° C. and as high as about 150° C. have given prepolymers which are convertible to good final polymers.

The invention is illustrated further by means of the following examples.

(The melting points hereinafter given were determined (except as otherwise stated) by rubbing a sample of polymer along a melting point bar in the direction of increasing temperature until a streak is produced and noting the temperature at the point where the streak shows a boundary between molten and non-molten polymer. The term "heat set," hereinbelow used, refers to heating at 100° C. for about an hour, and the term "boiled off" refers to heating in boiling water at 100° C. "Fatigue endurance limit" is measured in a Sonntag fatigue testing machine, in which a specimen is subjected to alternating compression and stretching with the same load along the same axis; the maximum stress which can be tolerated without breakage after ten million cycles is the "fatigue endurance limit.")

*Example 1.*—A mixture containing 0.1 mol of 3-methoxyhexamethylenediamine, 0.1 mol di-n-butyl oxalate, 25 cc. toluene and 0.05 gram of phosphorous acid reacted at room temperature to give within a few minutes a prepolymer having an inherent viscosity (inh.) of 0.3. The prepolymer was transferred into a test tube and heated under a slow stream of $N_2$ by a naphthalene vapor bath for 1 hour. The polymer had an inherent viscosity of 1.1. The resulting product could readily be drawn into fibers and could be pressed into thin films at 205° C. The polymer melted (crystalline M. P.=197). On slow cooling spherulites appeared at 179±2° C. etc. When the material was heated at 200° C. for periods up to six hours, less decolorization was observed than with hexamethylenediamine polyadipamide heated at the same temperature for one third the time (two hours). On raising the temperature to 300° C. gas evolution and more extensive decolorization indicated incipient decomposition. In general the polymer appeared to be more stable thermally then hexamethylenediamine polyadipamide. The density of the polymer ($d_4^{25}$) was 1.205 grams/cubic centimeter for shock cooled and amorphous material and 1.207 grams/cubic centimeter for partly crystal material. The latter product showed crystalline X-ray peaks, but evidently had a large amorphous content. A thin film of the shock-cooled material, made at a temperature of 205° C., exhibited a yield point of an elongation of 0.5% and a tension of 6000 lbs. per sq. in. (based on initial cross-section) after which it elongated smoothly at almost no increased loading up to 180%, above which the load increased markedly, the specimen breaking at 8070 lbs. per sq. inch and elongation of 296%. A specimen of 3-methoxyhexamethylenediamine polyoxamide fiber (final polymer) had the following properties.

*Tensile properties of 3-methoxyhexamethylene polyoxamide*

| Treatment | (Dry Fiber) Tensile Strength at Break, lbs./sq. inch | Elongation at Break, percent |
|---|---|---|
| Untreated | 35,400 / 34,300 | 35.6 / 30.0 |
| Heat set | 40,000 / 40,000 | 25.0 / 25.8 |
| Heat set, boiled off | 37,000 / 36,000 | 30.0 / 31.0 |

(FIBER IMMERSED IN WATER)

| | | |
|---|---|---|
| Untreated | 26,200 / 26,200 | 42.6 / 40.4 |
| Heat set | 29,300 / 25,800 | 21.8 / 25.4 |
| Heat set, boiled off | 28,000 / 22,000 | 31.6 / 20.8 |

The following table contains work recovery data obtained with single fibers of the final polymer:

*Percent work recovery of 3-methoxyhexamethylene polyoxamide*

[Single fiber extensometer, manual operation]

| Material | Environment | Elongation | | |
|---|---|---|---|---|
| | | 1% | 2% | 4% |
| Untreated | Dry (50% R. H., 25° C.) | 91.0 | 69.5 | 47.5 |
| Heat Set | | 87.0 | 53.0 | 47.0 |
| Heat Set [1] | | 88.1 | 64.2 | 53.5 |
| Heat Set | boiled-off | 77.5 | 40.0 | 38.0 |
| Untreated | Wet | 72.5 | 61.0 | 49.0 |
| Heat Set | | 69.0 | 73.5 | 80.9 |
| Heat set | boiled-off | 74.0 | 70.0 | 74.0 |

[1] Observations repeated using semiautomatic operation and chart recording. Conditions: 1% elongation per minute; ½ minute rest period at constant elongation between elongation and recovery cycles. Five successive cycles with intervening 10 minute rest periods at essentially no load.

*Example 2.*—A prepolymer prepared as described in Example 1 was heated at 218° C. for 4 hours in a stream of dry nitrogen in the presence of 0.25% phosphorus acid. The final polymer thus obtained had an inherent viscosity of 1.4.

*Example 3.*—Example 1 was repeated using 3-ethoxyhexamethylene polyoxamide instead of 3-methoxyhexamethylene polyoxamide. The final polymer thus obtained was converted into the form of brush bristles by extrusion. The brush bristles thus obtained were of excellent quality as shown by the following characterizations.

*Characterization of 3-ethoxyhexamethylene polyoxamide bristle*

| | 3-Ethoxyhexamethylene Polyoxamide Bristle | Pig Bristle |
|---|---|---|
| Inherent viscosity | 0.9 | |
| Draw ratio | 4.8 | |
| Stiffness ($10^5$ p. s. i.)—50% RH | 7.61 | 6.7 |
| Stiffness ($10^5$ p. s. i.)—wet | 5.2 | 2.7 |
| Wet/dry stiffness ratio | 68.5 | 40 |
| Fatigue resistance | 45.5 | 0 |
| Melting Point ° C. | 175 | |
| Water absorption percent | 3.4 | |

It will be appreciated that the foregoing examples illustrate specific methods of practicing the invention, and that numerous variations thereof are possible. For example, the prepolymerization can be carried out in an evaporator, still, or other suitable device instead of in a closed tube; the temperature during prepolymerization may be lowered or raised as desired; suitable methods may be used to assure equivalence of the quantities of polyamide-forming ingredients; to assure such equivalence; the acid content of the ester (when acid is present) can be measured and taken into account, in determining the exact quantities of diamine and ester required.

Methods for preparing the 3-alkoxyhexamethylenediamines which are employed in the practice of the invention are known in the art (cf. U. S. Patents 2,166,152 and 2,500,942). These diamines are preferably prepared by addition of alkanols to 1,4-dicyanobutene followed by hydrogenation of the resulting adduct. Since 1,4-dicyanobutene is an intermediate in commercial manufacture of hexamethylenediamine, and since oxalic acid is potentially the cheapest of the polyamide-forming dicarboxylic acids, it is apparent that the source materials employed in practicing the present invention are economically feasible, when compared with existing sources of polyamides particularly hexamethylenepolyadipamide.

It is to be understood that the polyamides obtained in the process of this invention can be employed in polyamide blends. Moreover, in particular embodiments the invention is applicable to the preparation of copolymers of the alkoxyhexamethylenediamines. For example, a copolymer containing 50% of 3-ethoxyhexamethylene polyoxamide and 50% of hexamethylene polyoxamide was prepared as described in the illustrative examples by substituting half of the 3-ethoxyhexamethylenediamine by hexamethylenediamine. The resulting copolymer had the following properties:

| | |
|---|---|
| Density | 1.18 |
| Hardness (M scale) | 75 |
| Heat distortion temp., 66 p. s. i., °C | 149 |
| Heat distortion temp., 264 p. s. i., °C | 67 |
| Tensile strength, $10^3$ p. s. i. | 10.5 |
| Elongation, per cent | 40 |
| Impact strength, 25° C., Izod | 0.86 |
| Stiffness, 25° C., $10^5$ p. s. i. | 3.83 |
| Deformation (2000 p. s. i., 50° C., per cent) | 1.7 |
| Fatigue endurance limit, p. s. i. | 4000 |
| Water absorption (ASTM) | 0.42 |
| Water absorption (sat.), per cent | 2.77 |
| Melting point, °C | 240 |

A polyoxamide in which the diamine component consisted of three methoxyhexamethylenediamine per one hexamethylenediamine had a melting point of 285°–295° C.

The fatigue endurance limit for a final polyoxamide in which the diamine component was made up of equivalent amounts of hexamethylenediamine and 3-isobutoxyhexamethylenediamine was 4200; when 3-methoxyhexamethylenediamine was used in such a 3-component polymer in place of 3-isobutoxyhexamethylenediamine the fatigue endurance limit was 3800 (p. s. i.).

The following table records the properties of a series of novel polyoxamides. The copolymers were prepared by using the mixed diamines. In each instance the diamine component was treated with 0.01% by weight of phosphorous acid and added to an equal weight of toluene, and a quantity of di-n-butyl oxalate corresponding exactly to one mol per mol of diamine. The di-n-butyl oxalate was free of acidic impurity, and was purified by shaking with 2 to 5% Ca(OH)$_2$ and removal of solids by filtration, followed by distillation at diminished pressure. The procedure for carrying out the pre-polymerization and final polymerization was as described in Example 1. The products had good fiber-forming properties, and were further characterized as follows:

*Physical properties of certain polyoxamides*

| Polyoxamide Identity | Softening Point, ° C. | Viscosity, inh. | Water Absorption Capacity, Percent |
|---|---|---|---|
| 3-Isobutoxyhexamethylene polyoxamide | 213 (M. P. 223) | 0.77 | 2.0 |
| Copolymer of equal amounts of hexamethylene polyoxamide and 3-methoxyhexamethylene polyoxamide | 253 | 1.1 | 3.0 |
| Copolymer of 41.5% by weight of 3-isobutoxyhexamethylene polyoxamide and 58.5% of hexamethylene polyoxamide | 250 | 0.70 | 1.74 |

The polymers obtained as hereinabove described are highly useful in the manufacture of fibers, including spun fibers, as well as in the preparation of plastics in various forms such as bristles, molded objects, etc. The low water absorption capacity of 3-ethoxyhexamethylene polyoxamide and 3-isobutoxyhexamethylene, and copolymers thereof, contributes importantly to the utility of these products in applications requiring low water absorption, and good resistance to degradation by light.

Since numerous embodiments of the invention will occur to those who are skilled in the art, it is to be understood that the invention is limited only as set forth in the claims.

I claim:

1. A process for preparing polymers which comprises preparing a prepolymer by reaction between a 3-alkoxy-hexamethylenediamine of the class consisting of 3-methoxyhexamethylenediamine, 3-ethoxyhexamethylenediamine, and 3-isobutoxyhexamethylenediamine and a dialkyl oxalate ester in which the alkyl groups contain from 1 to 4 carbon atoms at a temperature within the range of —7° C. to +150° C. in the presence of an inert organic diluent, separating the resulting prepolymer having an inherent viscosity within the range of 0.25 to 0.50 from the resulting mixture and thereafter converting the said prepolymer to a polymer having an inherent viscosity within the range of 0.9 to 1.4 by heating the said prepolymer in an oxygen-free atmosphere in the molten state at a temperature below its thermal decomposition temperature.

2. The process of claim 1 in which the final polymerization is carried out in the presence of phosphorous acid as a polymerization catalyst.

3. The process of claim 1 in which the diamine is 3-ethoxyhexamethylenediamine.

4. The process of claim 1 in which the diamine is 3-methoxyhexamethylenediamine.

5. The process of claim 1, in which the 3-alkoxy-hexamethylenediamine is a member of the class consisting of 3-methoxyhexamethylenediamine, 3-ethoxyhexamethylenediamine, and 3-isobutoxyhexamethylenediamine, and in addition thereto another diamine reactant is also employed during the prepolymerization, namely, hexamethylenediamine, the quantity of total diamine being substantially equivalent to the quantity of dialkyl oxalate.

6. 3-methoxyhexamethylene polyoxamide having an inherent viscosity within the range of 0.9 to 1.4.

7. 3-ethoxyhexamethylene polyoxamide having an inherent viscosity within the range of 0.9 to 1.4.

8. A polyoxamide copolymer having diamine components consisting of equimolar proportions of hexamethylenediamine and a diamine of the class consisting of 3-methoxyhexamethylenediamine, 3-ethoxyhexamethylenediamine, and 3-isobutoxyhexamethylenediamine.

References Cited in the file of this patent

UNITED STATES PATENTS

| | | |
|---|---|---|
| 2,176,074 | Jacobson | Oct. 17, 1934 |
| 2,558,031 | Allen et al. | June 26, 1951 |